United States Patent
Saif et al.

(12) 
(10) Patent No.: US 6,583,935 B1
(45) Date of Patent: Jun. 24, 2003

(54) LOW REFLECTION, HIGH TRANSMISSION, TOUCH-PANEL MEMBRANE

(75) Inventors: Mohtashim Saif, Chino, CA (US); Andrew Wrzesinski, Sherman Oaks, CA (US); Hassan Memarian, Northridge, CA (US)

(73) Assignee: CPFilms Inc., Martinsville, VA (US)

(*) Notice: Subject to any disclaimer, the term of this patent is extended or adjusted under 35 U.S.C. 154(b) by 0 days.

(21) Appl. No.: 09/665,053

(22) Filed: Sep. 19, 2000

Related U.S. Application Data

(63) Continuation-in-part of application No. 09/085,844, filed on May 28, 1998, now Pat. No. 6,266,193.

(51) Int. Cl.$^7$ .............................. G02B 1/10; H01H 1/10
(52) U.S. Cl. ................. 359/582; 359/580; 359/585; 428/333; 200/512; 200/514; 313/479
(58) Field of Search ................. 359/580, 582, 359/585; 428/333; 200/512, 514; 313/479

(56) References Cited

U.S. PATENT DOCUMENTS

| | | | |
|---|---|---|---|
| 2,478,385 A | 8/1949 | Gaiser | 359/580 |
| 2,854,349 A | 9/1958 | Dreyfus | 428/333 |
| 3,272,986 A | 9/1966 | Schmidt | 136/206 |
| 3,432,225 A | 3/1969 | Rock | 359/588 |
| 3,565,509 A | 2/1971 | Sulzbach | 359/588 |
| 3,682,528 A | 8/1972 | Apfel | 359/360 |
| 3,698,946 A | 10/1972 | Kaspaul | 428/432 |
| 3,781,077 A | 12/1973 | Groth | 359/360 |
| 3,781,090 A | 12/1973 | Sumita | 359/588 |
| 3,889,026 A | 6/1975 | Groth | 428/34 |
| 3,901,997 A | 8/1975 | Groth | 428/428 |
| 3,960,441 A | 6/1976 | Kamiya | 359/588 |
| 3,962,488 A | 6/1976 | Gillery | 427/109 |
| 4,017,661 A | 4/1977 | Gillery | 428/412 |
| 4,179,181 A | 12/1979 | Chang | 427/160 |
| 4,194,022 A | 3/1980 | Gillery | 427/109 |

(List continued on next page.)

FOREIGN PATENT DOCUMENTS

| | | | |
|---|---|---|---|
| EP | 0203730 A2 | 12/1986 | 359/581 |
| EP | 07/64857 A1 | 12/1992 | |
| EP | 581584 A1 | 2/1994 | 359/582 |
| EP | 07/198902 | 1/1995 | |
| EP | 0 656 258 A2 | 6/1995 | |
| JP | 476315 | 4/1972 | |
| JP | 476633 | 4/1972 | |
| JP | A 144702 | 7/1985 | 359/580 |
| JP | 63-265625 A * | 11/1988 | 359/585 |
| JP | 405323101 A * | 12/1993 | 359/582 |
| SU | 1543476 | 2/1990 | 359/580 |
| WO | WO 94/21838 | 9/1994 | |
| WO | WO 95/13189 | 5/1995 | |
| WO | WO 96/11289 | 4/1996 | |
| WO | WO 96/31343 | 10/1996 | |
| WO | WO 01/57579 A2 | 8/2001 | |

OTHER PUBLICATIONS

PCT International Search Report, Jun. 18, 1998, for PCT/US98/12707.

Primary Examiner—John Juba, Jr.
(74) Attorney, Agent, or Firm—Bacon & Thomas

(57) ABSTRACT

Low reflective, flexible, transparent, laminates having a sheet of flexible plastic substrate, a conductive outer layer on one side of the sheet, and an anti-reflective stack of at least one pair of oxide layers on at least one of the sides of the sheet, adapted for use as touch panel membrane electrodes in screen interface displays. A preferred laminate includes a flexible, polyethylene terephthalate sheet substrate having on one side a outer conductive surface of indium tin oxide and on one or both sides an anti-reflective stack of oxide layers, e.g., a stack of a layer of silicon dioxide and a layer of indium tin oxide. Preferred laminates have at least 90% transmission and less than 2% reflection of visible light in the range of 460 to 700 nm and are especially useful as touch panel electrodes, e.g., on computer display screens.

42 Claims, 17 Drawing Sheets

U.S. PATENT DOCUMENTS

| | | | | |
|---|---|---|---|---|
| 4,234,654 | A | 11/1980 | Yatabe | 428/333 |
| 4,313,647 | A | 2/1982 | Takazawa | 359/588 |
| 4,337,990 | A | 7/1982 | Fan | 359/360 |
| 4,422,721 | A | 12/1983 | Hahn | |
| 4,519,154 | A | 5/1985 | Molari | 40/615 |
| 4,548,691 | A | 10/1985 | Dietrich | 427/160 |
| 4,556,277 | A | 12/1985 | Fan | 359/360 |
| 4,609,267 | A | 9/1986 | Deguchi | 351/163 |
| 4,639,069 | A | 1/1987 | Yatabe | 427/160 |
| 4,648,691 | A | 3/1987 | Oguchi | 349/162 |
| 4,721,349 | A | 1/1988 | Fan | 359/360 |
| 4,725,109 | A | 2/1988 | Wank | 359/890 |
| 4,786,767 | A * | 11/1988 | Kuhlman | 200/5 |
| 4,790,922 | A | 12/1988 | Huffer | 204/192.27 |
| 4,802,967 | A | 2/1989 | Kittler | 204/192 |
| 4,828,346 | A | 5/1989 | Jacobson | 427/163 |
| 4,865,711 | A | 9/1989 | Kittler | 204/192.14 |
| 4,907,846 | A | 3/1990 | Tustison | 359/580 |
| 4,910,090 | A * | 3/1990 | Kuhlman et al. | 428/469 |
| 4,913,762 | A | 4/1990 | Kittler | 204/192.14 |
| 4,938,857 | A | 7/1990 | Gillery | 204/192.27 |
| 4,952,783 | A | 8/1990 | Aufderheide | 219/528 |
| 4,977,013 | A | 12/1990 | Ritchie | 428/212 |
| 4,997,241 | A | 3/1991 | Muratomi | 359/589 |
| 5,059,295 | A | 10/1991 | Finley | 204/192.27 |
| 5,073,450 | A | 12/1991 | Nietering | 428/336 |
| 5,105,310 | A | 4/1992 | Dickey | 359/586 |
| 5,159,490 | A | 10/1992 | Amano | 359/584 |
| 5,170,291 | A | 12/1992 | Szcyrbowski | 359/580 |
| 5,181,141 | A | 1/1993 | Sato | 359/580 |
| 5,190,807 | A | 3/1993 | Kimock | 428/216 |
| 5,216,542 | A * | 6/1993 | Szczyrbowski et al. | 359/588 |
| 5,270,858 | A | 12/1993 | Dickey | 359/586 |
| 5,337,191 | A | 8/1994 | Austin | 359/885 |
| 5,362,552 | A | 11/1994 | Austin | 428/216 |
| 5,448,037 | A | 9/1995 | Takase | 219/547 |
| 5,460,888 | A | 10/1995 | Hashimoto | 428/432 |
| 5,510,173 | A | 4/1996 | Pass | 428/216 |
| 5,521,765 | A | 5/1996 | Wolfe | 359/885 |
| 5,579,162 | A | 11/1996 | Bjornard | 359/580 |
| 5,742,119 | A * | 4/1998 | Aben et al. | 313/479 |
| 5,744,227 | A | 4/1998 | Bright | 359/585 |
| 5,846,649 | A | 12/1998 | Knapp | 428/334 |
| 5,874,801 | A * | 2/1999 | Kobayashi et al. | 313/478 |
| 5,920,431 | A | 7/1999 | Tokuhiro | 359/581 |
| 5,981,059 | A * | 11/1999 | Bright et al. | 428/336 |
| 5,989,693 | A | 11/1999 | Yamasaki | 359/580 |
| 6,248,448 | B1 * | 6/2001 | Lippey et al. | 428/432 |
| 6,319,594 | B1 * | 11/2001 | Suzuki et al. | 428/208 |
| 6,512,512 | B1 * | 1/2003 | Blanchard | 345/173 |

* cited by examiner

Proposed Invention

LOW REFLECTION, HIGH TRANSMISSION, TOUCH-PANEL MEMBRANE

This application is a continuation in part of Ser. No. 09/085,844, filed May 28, 1998 and now U.S. Pat. No. 6,266,193 the full disclosure of which is incorporated herein by reference.

Disclosed herein are low reflection, flexible, transparent, laminate electrodes and methods of making and using such electrodes, e.g. as a flexible electrode component of touch panel membrane switches.

BACKGROUND OF THE INVENTION

A modern, electronic input device is a touch panel which is a transparent input device mounted in front of a video display. A touch panel is composed of two planer electrodes, one on top (or in front) of the other and separated by a thin space. The base electrode is usually rigid while the top electrode is flexible. The flexible electrode is called the touch panel membrane and comprises a conductive surface on a flexible sheet. Small dots of plastic are printed on the base electrode to create the gap that separates the two electrodes. The air gap is maintained between the two electrodes until the outer, flexible electrode is pressed, at a point, against the base electrode. The electronics of the device then compute the spatial position where contact between the two electrodes was made. The input is then used, as the application requires.

The touch panel is mounted in front of a display, so both electrodes must be optically transmissive. As a general rule, the more transmissive the better. This is usually accomplished by fabricating the base electrode of plastic or glass that has been coated with a transparent conductive material. The flexible electrode is a sheet of flexible plastic that has also been coated with a transparent conductive material. The two conductive layers are placed face to face. Under the pressure of a finger or stylus the flexible electrode bends down between the dots and makes electrical contact with the base electrode.

Each air/surface interface in the display generates a reflection. These reflections degrade the image from the display. The touch panel membrane has two surface/air interfaces. The interface that faces the viewer is called the "front" surface of the touch panel. The conductive surface interface at the "back" of the flexible sheet faces the air gap. Hereinafter these two sides are referred to as "front" and "back". Both ambient light and light from the display are reflected at these two interfaces. Light from the display is reflected away from viewer and ambient light is reflected to the viewer. These occurrences combine to alter the color of the display, decrease brightness, and reduce the contrast ratio. This is a degradation of display performance.

The touch panel membrane is a composite construction based on a flexible sheet of plastic. The back side of the sheet, that makes contact with the base electrode, must be conductive. A thin layer of a transparent inorganic or, more recently, polymeric material is applied to provide the conductivity.

The front side of the sheet is usually coated with a hard plastic layer to withstand the constant contact from fingers or a stylus. In industry these are so-called 'hard coats'. For added durability the front and back sides of the substrate can be coated with hard coats.

SUMMARY OF THE INVENTION

This invention provides low reflective, transparent laminates which are useful as touch panel membrane electrodes. One aspect of the invention presented here is a touch panel membrane electrode that is both low reflecting and highly transmitting in the visible region. By reducing the light that is reflected from one or both surfaces of the flexible electrode, the view of the display is substantially improved. In addition, the laminate can be used for the base electrode, e.g. laminated onto a glass CRT screen. This reduces the reflection from where the base electrode meets the air gap.

The present invention restores the color, brightness and contrast to the display by modifying the front and/or back side of the membrane, using :thin-film anti-reflective layer (s). For best results both sides of the film can have anti-reflecting layers, and the base electrode can also have an anti-reflective layer. In addition to the use of anti-reflective thin films, the hard coats themselves may be physically modified to scatter some of the ambient light, reducing the reflection seen by the viewer even more.

In an aspect of the invention there is provided a flexible, transparent laminate adapted for use as an anti-reflective, membrane electrode. Such laminate is preferably manufactured in a continuous web comprising (a) a sheet of flexible, plastic substrate, (b) a conductive outer layer on one side of the substrate sheet, and (c) an anti-reflective stack of at least one pair of oxide layers on at least one of the sides of the substrate sheet. The laminate can be provided in wound rolls of continuous web.

The present invention may be embodied in three different ways. In every embodiment the touch panel membrane has a sheet of plastic film as a substrate. This plastic film is light transmissive, at least 60%, in the visible light range of 400 to 750 nanometers (nm), more preferably at least 80%, transmissive or higher, even more preferably at least 90% transmissive in the visible light range of 460 to 700 nm. The plastic film may be coated, on one side or both, with a scratch resistant layer. This layer may have a smooth surface or be textured to provide anti-glare properties. The hard layer(s) may be composed of a single material or layers of different materials. Each material may be organic or inorganic, homogeneous or contain particulate.

The first embodiment of the invention incorporates an anti-reflective thin film stack on the front of the membrane. The layer stack is applied to the front surface, on top of a hard layer, if present. The anti-reflective thin film stack may consist of one to 10 or more layers. One or more of the layers may be electrically conductive, e.g. to reduce static charge. The layers may be deposited by vacuum process or from a gas or liquid. The anti-reflective thin-film stack reduces the reflection to an average of 2% or lower between 400 and 700 nm. The top layer of the anti-reflective thin-film stack may be a low surface-energy, anti-finger print material. The back side of the film has only a transparent conductive coating. This layer may consist of one or more layers.

The second embodiment of the invention incorporates an anti-reflective thin film stack on the back of the sheet. The layer stack is applied to the back side on top of the hard layer but under the conductive layer. The anti-reflective, thin-film stack is composed of one to 10 or more layers. One or more of the layers may be conductive. The layers may be deposited by vacuum process or from a gas or liquid. The anti-reflective thin-film stack reduces the reflection of the conductive layer to an: average of 5 or less, between 400 and 700 nm. The front side of the film has only a hard layer.

This construction may also be used for the base electrode of the touch panel or pen entry device. The film can be laminated to a rigid, transparent substrate with the conductive layer facing the air gap. Having the anti-reflective thin film stack under the base electrode serves to improve the view of the display even more.

The third embodiment of the invention incorporates anti-reflective, thin film stacks on both the front and back sides of the sheet. One layer stack is applied to the front side, on top of the hard layer, if present. A second layer stack is applied to the back side, on top of the any hard layer but under the conductive layer. The anti-reflective, thin-film stacks are composed of one to 10 or more layers. One or more of the layers may be conductive. The layers may be deposited by vacuum process or from a gas or liquid. The anti-reflective, thin-film stack on the front reduces the reflection to an average of 2 or lower between 400 and 700 nm. The top layer on the anti-reflective thin-film stack may be a low surface-energy, anti-finger print material. On the back, the anti-reflective thin-film stack reduces the reflection of the conductive layer to an average of 5 or less, between 400 and 700 nm.

This invention also provides improvements in devices where data is entered by pressure activation on the surface of a display screen having a membrane electrode surface. The improvements arise from the use of an anti-reflective, conductive sheet in the electrode assembly.

DETAILED DESCRIPTION OF PREFERRED EMBODIMENTS

As used herein "visible light" means the electomagnetic spectrum in the range of 400 to 700 nm.

As used herein the term "laminate" means a multilayer sheet where distinct layers of materials are applied by a variety of methods, e.g. vacuum deposition, solution films, etc. For instance, layers of organic material as can be used in hard coat, low surface energy and conductive polymer layers of a laminate are typically applied as wet films of a solution coating. Layers of inorganic materials such as oxides and nitrides as can be used in precoat, primer, inorganic oxide conductor and anti-reflective stack layers of a laminate are typically applied by vacuum deposition.

The invention provides a low reflective, transparent, laminate useful as flexible membrane electrodes such as touch panels or pen interactive screens. In one aspect of the invention such a laminate electrode is a flexible, touch panel membrane that has reduced light reflection and increased light transmission. In all embodiments of a flexible, touch panel membrane the physical substrate of the invention is a sheet of transparent, flexible plastic. This plastic sheet substrate is usually polyethylene terephthalate (PET) and is about 0.007" in thickness. Other plastic materials may be substituted as long as the required physical properties are present, i.e. good optical transmission and sufficient flexibility. The flexibility required depends upon the design and application the panel and is specified by the panel designer.

Because the plastic sheet substrate is relatively soft, the surface hardness of the substrate is typically increased by the addition of a hard coat. A hard coat is high hardness coating applied to the plastic sheet substrate. The thickness of the layer must by sufficient to provide the required scratch resistance, but not so thick as to curl or crack under use. This thickness is usually in the range of 1 to 10 micrometers. The hard coat material may be organic, inorganic or a mixture of both. In some cases the total thickness may be made up of several thinner layers of different materials. Hard coats are well known and can be readily selected by a person of ordinary skill in the art.

The surface of the hard coat is usually smooth. The surface of a hard coat can be intentionally roughened to reduce specular reflection off the surface. When a surface is roughened, however, the specular transmission also decreases. These 'anti-glare' hard coats may contain particulate or may be patterned to produce the desired surface. In general, any type of transparent hard coat that is compatible with the materials of this invention may be used. The hard coat may be applied to the front or the back side of the plastic sheet. It may also be applied to both sides of the plastic sheet. For some application no hard coat may be needed at all.

Figure 1A:
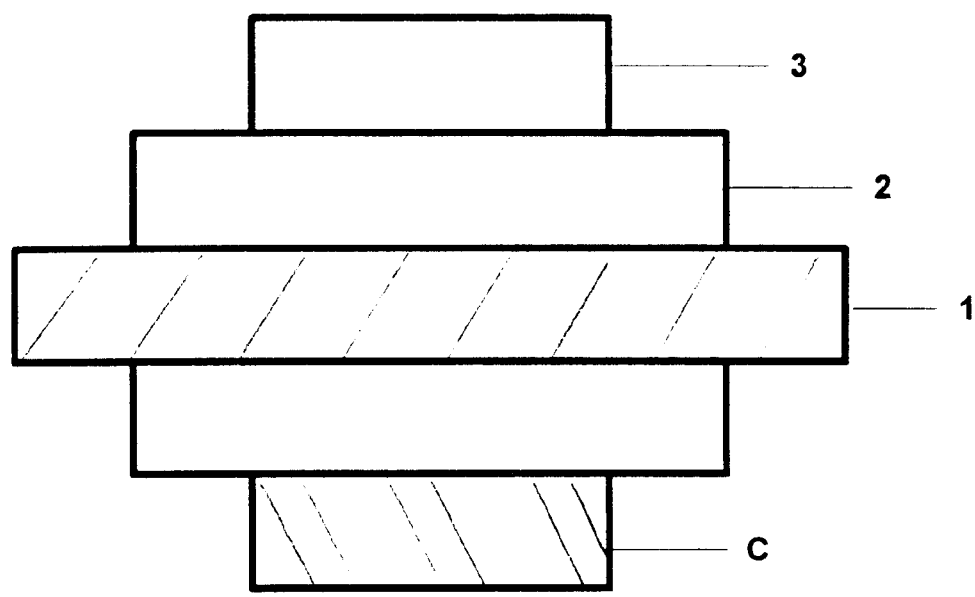
FIGS. 1A, 2A, 3A, 4A, 5A, 6A, 7A and 8A are diagrammatic representations of a laminate electrodes having an anti-reflective feature of the invention.

With reference to FIG. 1A in a first embodiment of the laminate of invention, the front side of the plastic sheet substrate 1 is coated with a transparent hard coat layer 2 and a thin film anti-reflective stack 3. The back side of the laminate has a transparent conductor layer C. This transparent conductive material is coated directly onto the plastic sheet or onto an intermediate hard coat 2'. The conductive layer is usually a transparent, conductive metal oxide such as indium tin oxide (ITO), antimony tin oxide (ATO), tin oxide, indium zinc oxide, and the like or a conductive polymer. The conductive surface may be protected with a metal or oxide layer, e.g. from 0.5 to 50 nm of palladium, chromium, zirconium, aluminum or titanium or from 0.5 to 10 nm of tin oxide, titanium oxide, zirconium oxide, tantalum oxide or silicon oxide.

In general, the laminate of this invention may incorporate any type of conductive and optically transparent material. An anti-reflective, thin-film stack 3 is applied on the front side of the laminate electrode. The number of layers and types of materials in the thin-film stack will depend on the degree to which the reflection is to be reduced. The thin films may be homogeneous or graded, organic or inorganic; and, they may be applied by vacuum deposition or from gas or liquid. Useful materials are oxide and nitrides. Preferred anti-reflective stacks are disclosed in copending application Ser. No. 09/085,844. Anti-reflective stacks are also disclosed in International Application WO 96/31343 and European Application No. EP 0 764 857, all of which are incorporated herein by reference. A preferred anti-reflective stack comprises alternating layers of indium tin oxide and silicon dioxide. Other combinations of layered materials are well known in the art. The layers of the stack will be designed such the air/surface interface is made anti-reflective. The optical index of the material (s) selected for the substrate of hard coat is not critical, as the anti-reflective stack can typically be designed to anti-reflect any of the common materials. Depending upon the base material and the level of reflection desired, the anti-reflective stack will be composed of a number of thin layers of high, low, and medium index materials. For all applications the front-surface reflection will be lowered below 2%. For most application a reflection of less than 1 is desirable.

Figure 1B:
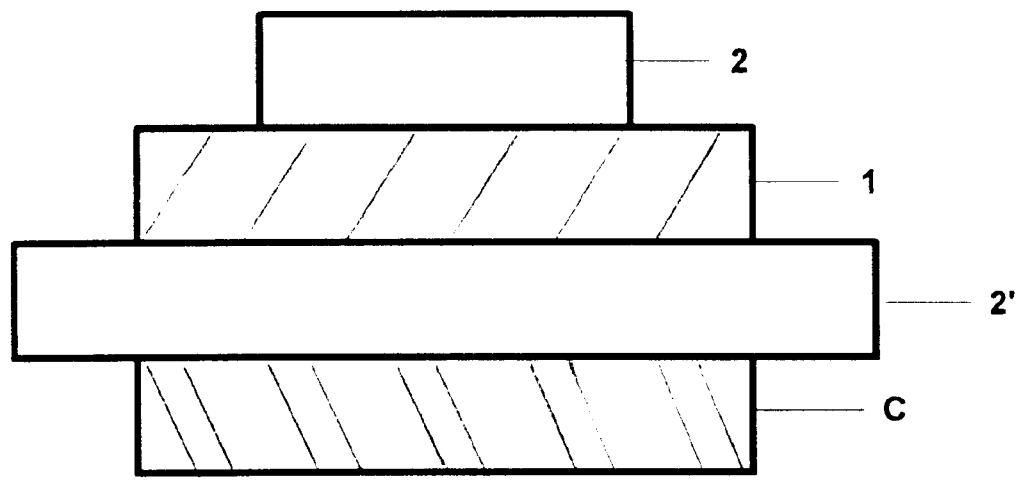
FIGS. 1B and 8B are diagrammatic representation of a laminate electrode of the prior art.
Figure 1C:
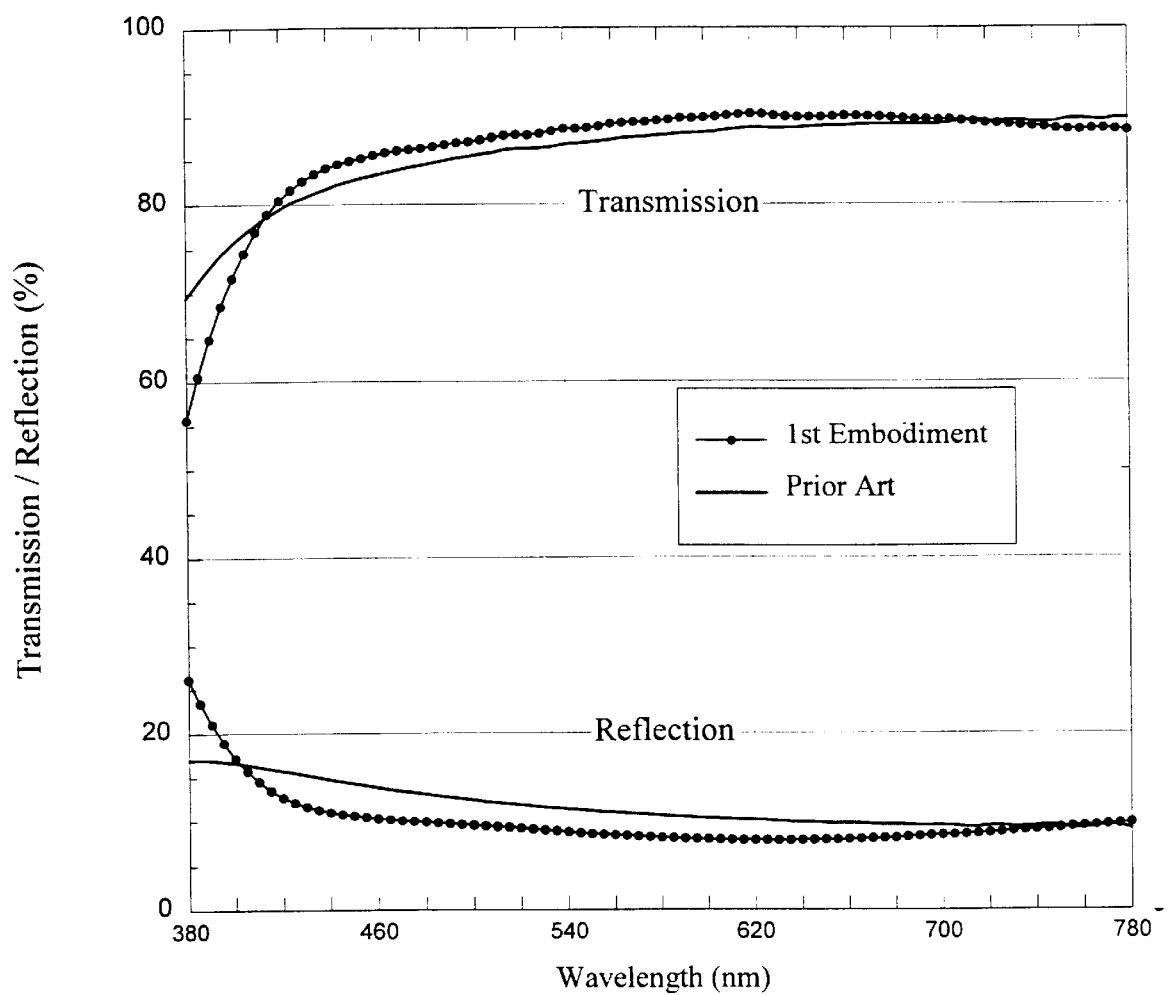
FIGS. 1C, 2B, 3B, 4B, 5B, 6B, 7B, 8C and 9 are graphical presentations of spectral performance, e.g. visible light reflection and transmission, of the transparent laminate electrodes.

The anti-reflective thin film stack may be coated with a low-surface energy material to promote easy cleaning of the front surface. This layer is incorporated in the anti-reflective thin-film stack design. FIG. 1C compares the reflection and transmission, across the visible light spectrum, of the laminates of this invention as illustrated in FIG. 1A to a standard touch membrane of the prior art as illustrated in FIG. 1B having a conductive layer C applied directly to a hard coat layer 2'. The increase in transmittance translates into a brighter display and the decreased reflection from the front surface improves the contrast ratio.

Figure 2A:
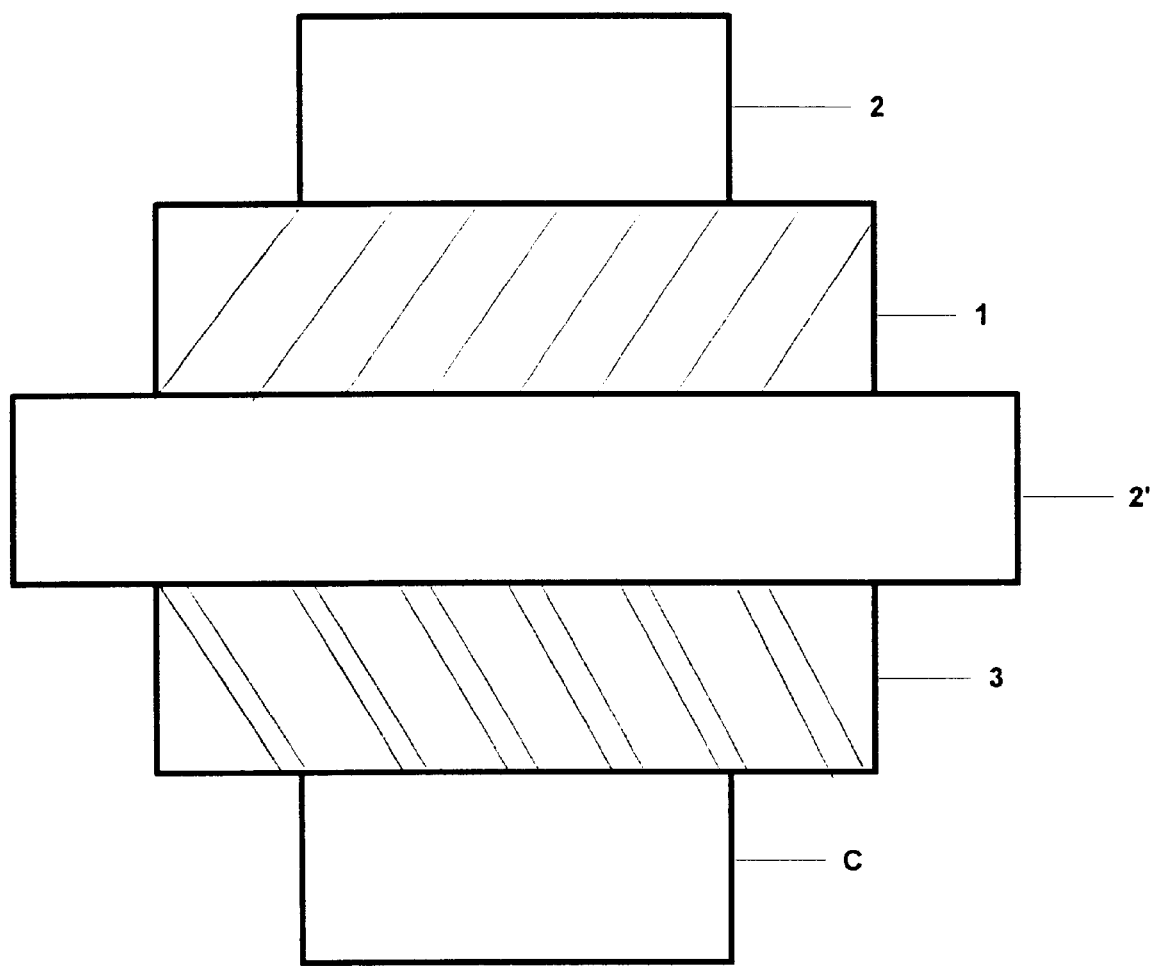

With reference to FIG. 2A in a second embodiment of the invention, the front side of the flexible, transparent substrate is coated with a hard coat layer 2 and the back side has,an hard coat layer, 2', a thin film, anti-reflective stack 3 and transparent conductive material layer C. In this second embodiment of the invention, the front side of the plastic sheet substrate has no anti-reflective thin-film stack. The front side may have a low-surface energy layer that will make some reduction in the front side reflection.

On the back side of the electrode the anti-reflective thin-film stack is applied to the plastic sheet substrate directly, but more preferably on a hard coat. The stack will be designed such that the outer layer in the stack (at the air gap) is the transparent conductive coating, e.g. ITO. Otherwise, the anti-reflective stack can be made as discussed above to minimize the reflection from the back surface.

Where high refractive index (about 2.0) transparent, conductive materials used for the conductive layer can range from 10 to 300 nm, The preferred optical design will call for a very thin layer of the material, e.g. about 10 to 30 nm depending on the desired conductivity. This is because of the large index mismatch between the conductive layer and air and between the conductive layer and the plastic film. The conductive layer, however, may usually not be made so thin as to produce the lowest reflection. As the conductive material is made thinner the sheet resistance of the surface will increase. The electronics of the touch panel will require a specific sheet resistance and the optics must accommodate the requisite thickness of conductive material.

As a consequence of having a high-index material facing air, the reflection from the backside is generally not reduced to less than 2%. When a transparent conductive material is deposited directly to the back of the plastic sheet substrate, considerable reflection is produced. Thus, the addition of a thin-film, anti-reflective stack greatly improves the transmission. The actual reflection from the back side will depend on the thickness and refractive index of the layers. For example, a 20 nm of conductive layer of ITO, with a single high and a single low index layer underneath it can have an average reflection of less than 6% for 400 to 700 nm.

This embodiment is useful as either electrode of a touch panel, i.e. as the flexible electrode or as the rigid base electrode adhered to glass face of a CRT or other display with the conductive coating facing the air gap. When applied to a rigid substrate, a hard coat can be used but is generally not required. For instance, the laminate electrode can be applied to a rigid substrate with an anti-reflective stack and conductive surface facing the air gap. The conductor/air interface will also be low reflecting and high transmitting to provide an improved view of the display. For best results, the contiguous, flexible membrane will feature anti-reflective stack on at least one of its sides.

Figure 2B:
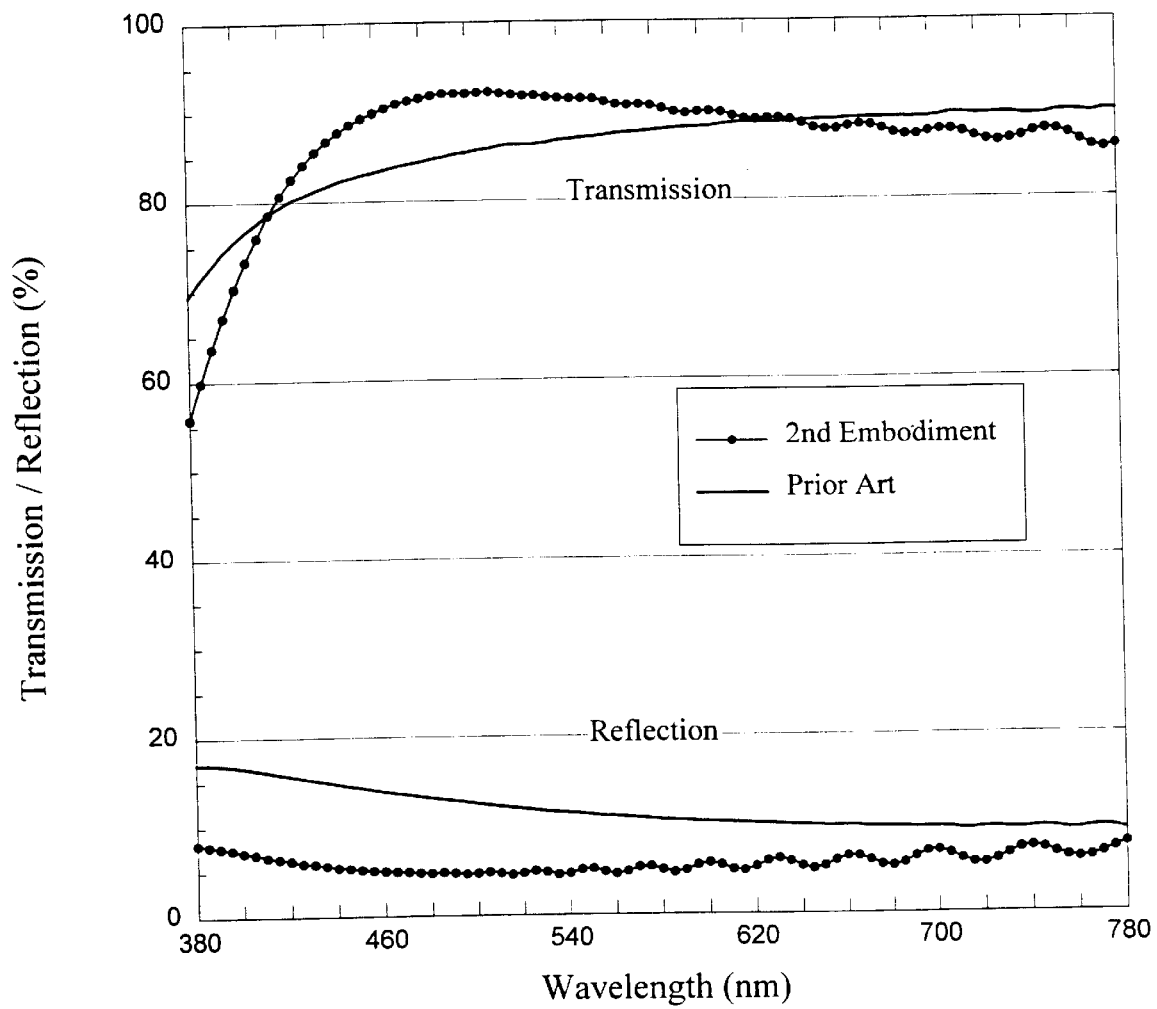

FIG. 2B compares the reflection and transmission, across the visible spectrum, of the laminate of this invention as illustrated in FIG. 2A to that of a prior art flexible electrode as illustrated in FIG. 1B. The increase in transmittance translates into a brighter display and the decreased reflection form the front surface improves the contrast ratio.

Figure 3A:
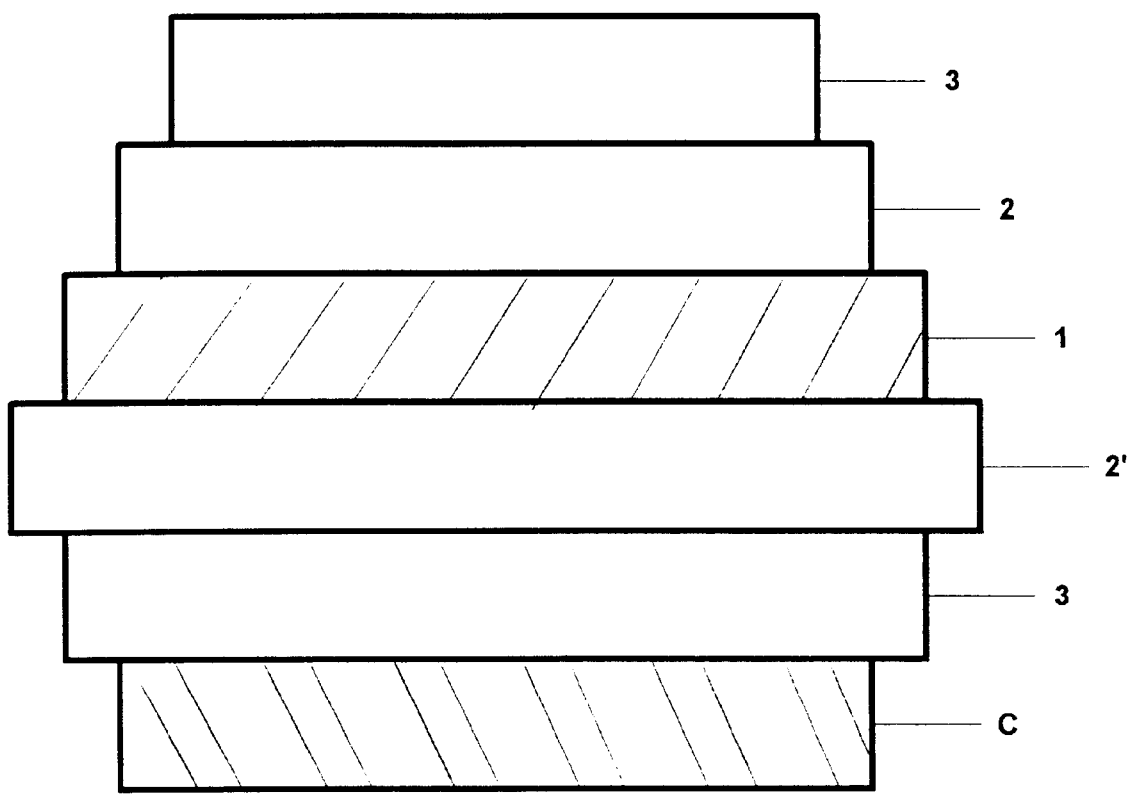
Figure 3B:
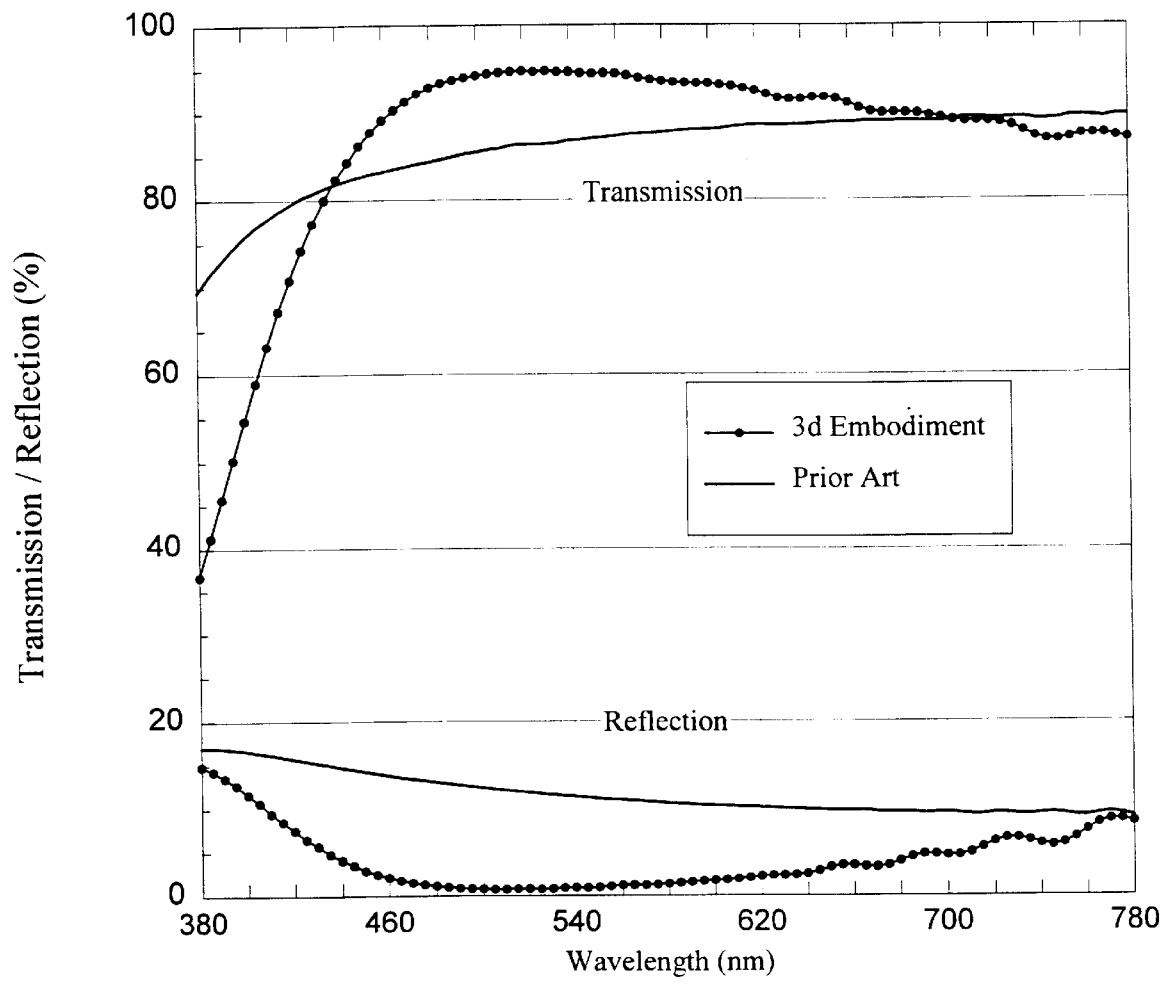

With reference to FIG. 3A in a third embodiment of the invention, both sides of the plastic sheet substrate 1 have hard coats 2 and 2' and anti-reflective thin-film stacks 3 and 3' as discussed above. The back side also has a conductor layer C. This is a preferred embodiment of the invention with the highest performance where the front-surface reflection will be lowered below 2%, preferably less than 1%. FIG. 3B compares the reflection and transmission, across the visible spectrum, of laminates of the invention as illustrated in FIG. 3A to that of a prior art flexible electrode as illustrated in FIG. 1B. The increase in transmittance translates into a brighter display and the decreased reflection form the front surface improves the contrast ratio.

The following examples are intended to illustrate and not limit the scope of the invention. Modifications of these examples will be readily apparent to those skilled in the art.

EXAMPLE 1

Back Side (Conductive Surface) Anti-Reflection

Figure 4A:
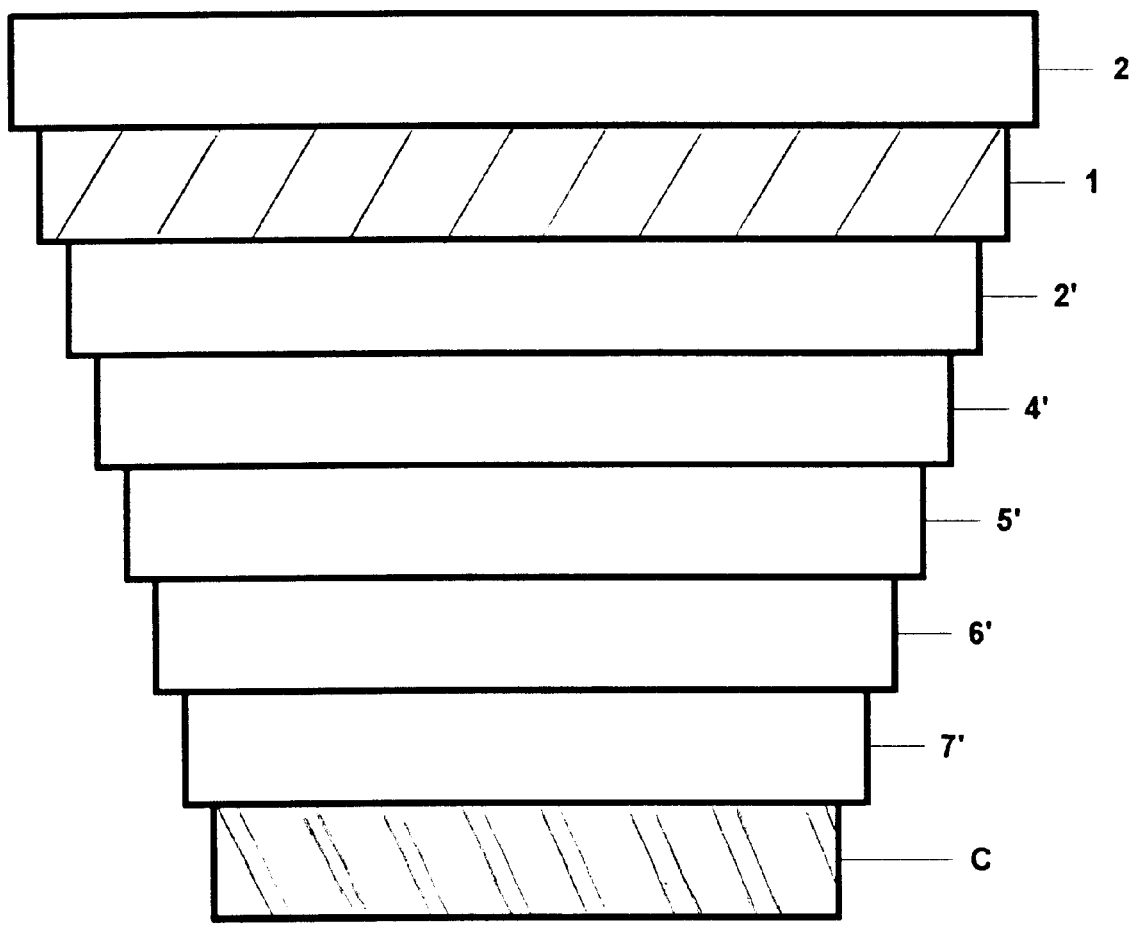

This example illustrates the partial fabrication of a laminate of this invention having layers on the back side of the substrate as shown in FIG. 4A. The substrate 1 for the laminate is a transparent, flexible PET sheet having a thickness of 0.18 mm (7 mil) and coated on one side with a clear hard coat 2 with a thickness of about 3 to 4 micrometers ($\mu$m) and on the other side with an anti-glare (roughened surface) hard coat 2' with a thickness of about 3 to 4 $\mu$m. The following layers were applied in a roll-to-roll vacuum sputtering coater having an 81 centimeter (32 inch) drum and a 112×28 cm (14×11 inch) cathode.

Pre-Treatment: A titanium oxide pre-treatment layer 4' was deposited onto the anti-glare hard coat passing at 4.6 meters per minute (mpm) (15 feet per minute) by DC sputtering from a titanium target at 1 killowatt (KW) power, 1.5 milliTorr (mTorr) total pressure, in a 50:50 argon/oxygen gas mixture fed at 175 standard cubic centiliters per minute (sccm).

Primer layer: A silicon oxide primer layer 5' was deposited onto the titanium oxide pre-treatment layer passing at 4.6 mpm by dual magnetron sputtering from a boron-doped silicon target at 12 KW power, 2.6 mTorr total pressure, in an argon/oxygen mixture with argon fed at 271 sccm and oxygen fed at 50 sccm.

Titanium dioxide layer: A 28 nm thick titanium dioxide anti-reflective stack component layer 6' was deposited onto the silicon oxide primer layer passing at 1.4 mpm by dual magnetron sputtering from a titanium target at 40 KW power, 1.7 mTorr total pressure, in an argon/oxygen mixture with argon fed at 215 sccm and oxygen fed at 80 sccm.

Silicon dioxide layer: A 64 nm thick silicon dioxide anti-reflective stack component layer 7' was deposited onto the titanium dioxide layer passing at 1.4 mpm by dual magnetron sputtering from a boron-doped silicon target at 30 KW power, 3.0 mTorr total pressure, in an argon/oxygen mixture with argon fed at 270 sccm and oxygen fed at 170 sccm.

Indium tin oxide layer: A 16 nm thick indium tin oxide conductive outer layer C (which is also a component of the anti-reflective stack) was deposited onto the silicon dioxide layer passing at 2.3 mpm by DC sputtering from an indium tin oxide target at 6.3 KW power, 1.64 mTorr total pressure, in an argon/oxygen mixture with argon fed at 175 sccm and oxygen fed at 11 sccm. The conductive coating layer has a conductivity of 300 to 325 ohms/square.

Figure 4B:
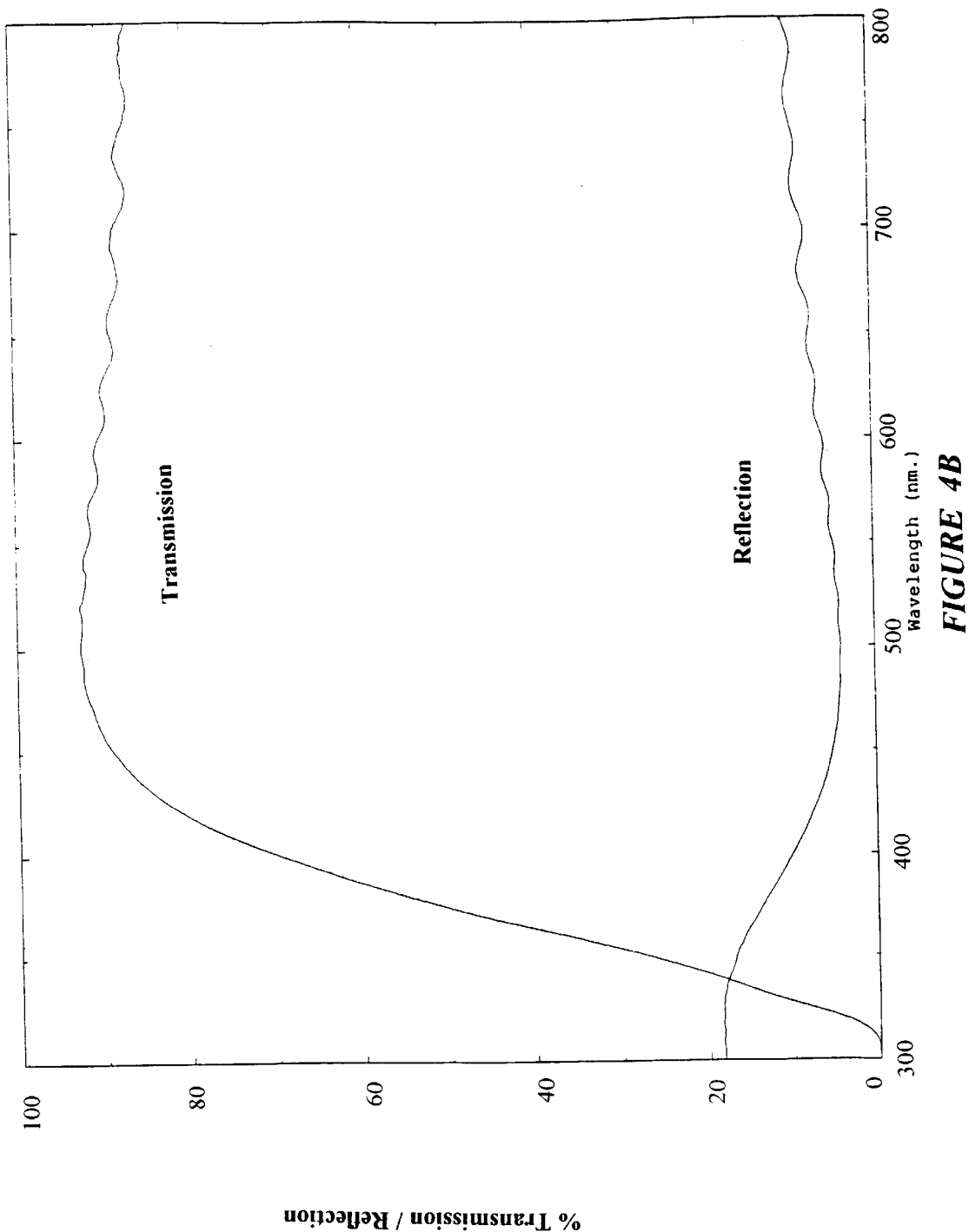

The laminate structure on the conductive coating side of the substrate had 91.73% transmittance, 4.82% reflectance and 3.45% absorption at 550 nm. Transmittance and reflectance data for a wider spectrum of visible light is shown in FIG. 4B. The laminate structure exhibited good adhesion, hardness and abrasion resistance properties

EXAMPLE 2

Front Side (User Interface Side) Anti-Reflection

This example illustrates the partial fabrication of a laminate of this invention having layers on the front (user interface) side of the substrate with reference to FIG. 5. The laminate was prepared using the hard coated PET substrate as described in Example 1. An anti-reflective stack of oxide layers was constructed on the front side of the substrate using the vacuum sputtering apparatus described in Example 1 for all layers but the fluoropolymer low surface energy layer which was applied from solution.

Pre-Treatment: A titanium oxide pre-treatment layer 4 was deposited onto the clear hard coat passing at 3.7 mpm by DC sputtering from a titanium target at 1 killowatt (KW) power, 1.5 mTorr total pressure, in a 50:50 argon/oxygen gas mixture fed at 175 sccm.

Primer layer: A silicon oxide primer layer 5 was deposited onto the titanium oxide pre-treatment layer passing at 3.7 mpm by dual magnetron sputtering from a boron-doped silicon target at 12 KW power, 2.6 mTorr of total pressure, in an argon/oxygen mixture with argon fed at 270 sccm and oxygen fed at 50 sccm.

First indium tin oxide layer: A 25 nm thick first indium tin oxide anti-reflective stack component layer 8 was deposited onto the silicon oxide primer layer passing at 3.1 mpm by DC magnetron sputtering from a indium tin oxide target at 5.5 KW power, 1.4 mTorr total pressure, in an argon/oxygen mixture with argon fed at 175 sccm and oxygen fed at 13 sccm.

First silicon dioxide layer: A 25 nm thick first silicon dioxide anti-reflective stack component layer 7 was deposited onto the first indium tin oxide layer passing at 3.1 mpm by dual magnetron sputtering from a boron-doped silicon target at 28 KW power, 3.0 mTorr total pressure, in an argon/oxygen mixture with argon fed at 270 sccm and oxygen fed at 170 sccm.

Second indium tin oxide layer: A 73 nm thick second indium tin oxide anti-reflective stack component layer 8 was deposited onto the first silicon dioxide anti-reflective stack component layer passing at 0.9 mpm by DC magnetron sputtering from a indium tin oxide target at 5.5 KW power, 1.4 mTorr total pressure, in an argon/oxygen mixture with argon fed at 175 sccm and oxygen fed at 13 sccm.

Second silicon dioxide layer: A 94 nm thick second silicon dioxide anti-reflective stack component layer 7 was deposited onto the second indium tin oxide anti-reflective stack component layer passing at 0.9 mpm by dual magnetron sputtering from a boron-doped silicon target at 28 KW power, 3.0 mTorr total pressure, in an argon/oxygen mixture with argon fed at 270 sccm and oxygen fed at 170 sccm.

Low surface energy layer: A low surface energy layer 9 of fluoropolymer was deposited as a solution onto the second silicon dioxide anti-reflective stack component layer and allowed to dry to a polymeric film having a thickness of 5 to 10 nm and a surface energy of less than 40 dynes/cm.

Figure 5A:
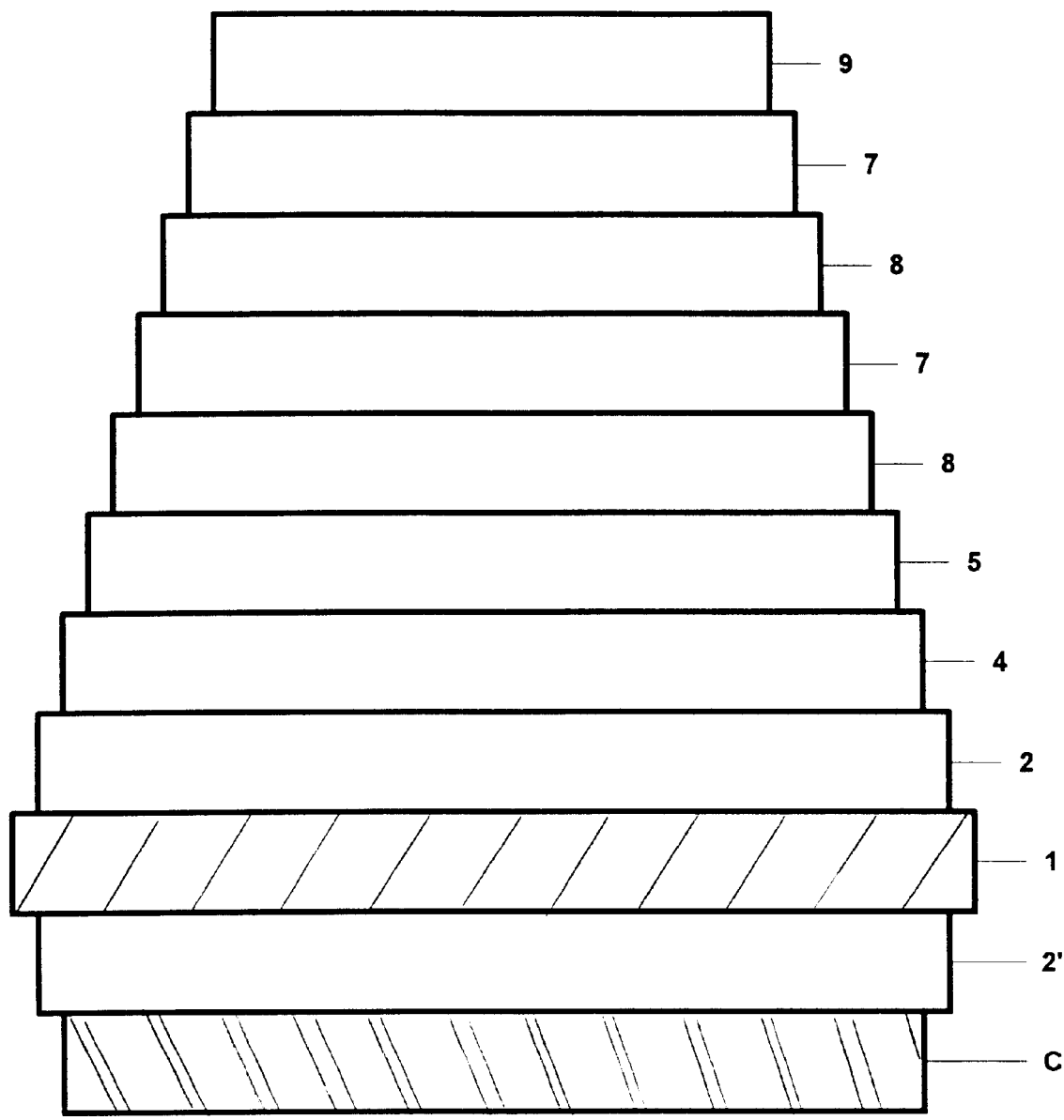
Figure 5B:
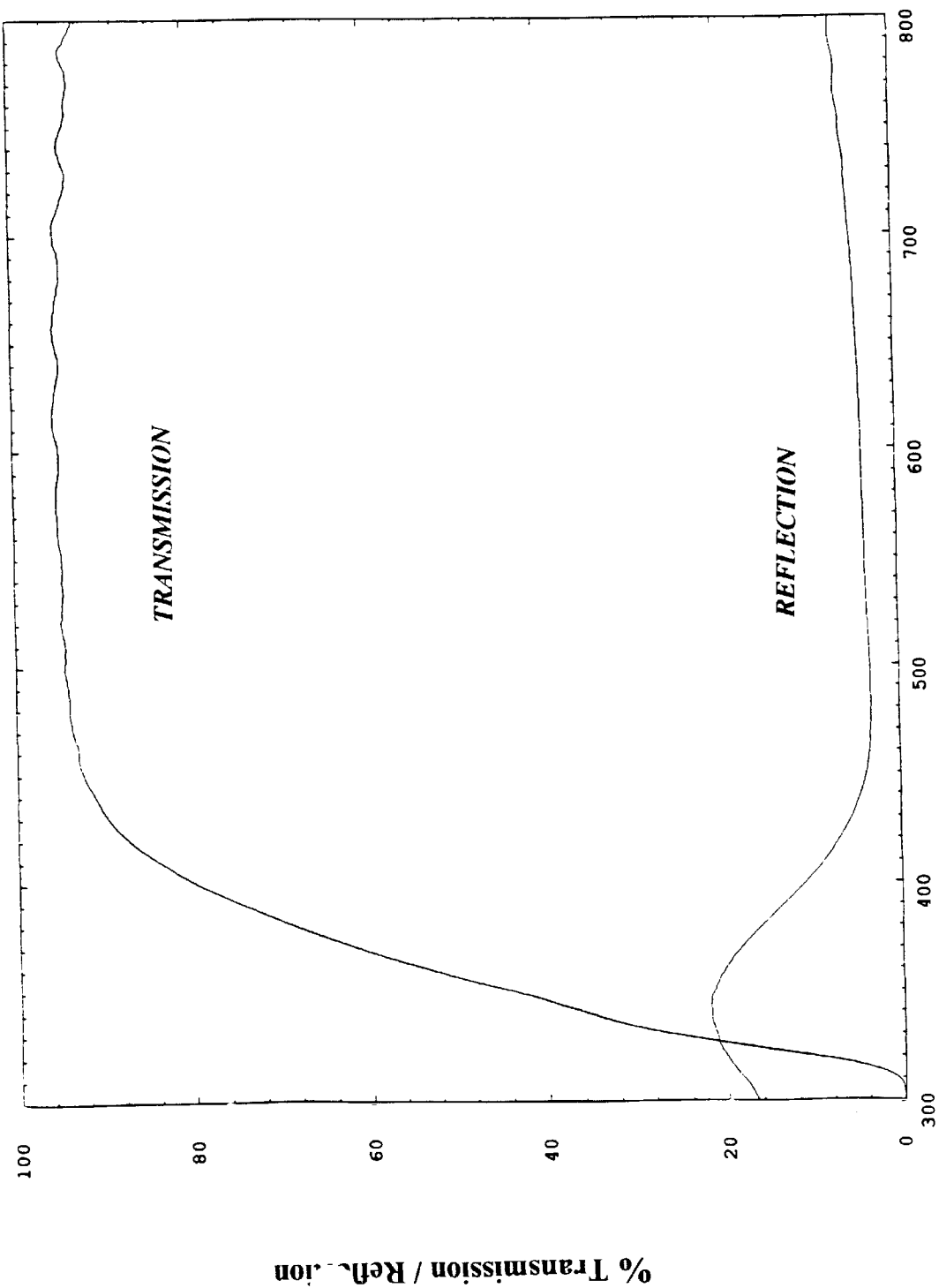

With reference to FIG. 5A the laminate structure prepared in this Example 2 comprised a transparent, flexible substrate of 0.18 mm (7 mils) thick PET 1. On the front side of the substrate there was a clear hard coat layer 2, a silicon oxide primer layer 5, an anti-reflective stack comprising a first 25 nm thick layer of indium tin oxide 7, a first 25 nm thick layer of silicon dioxide 6, a second 73 nm thick layer of indium tin oxide 7, a second 94 nm thick layer of silicon dioxide 6 and a low surface energy layer 8. On the back side of the substrate there is an anti-glare hard coat 2' and a conductive layer C. Transmittance and reflectance data for visible light is shown in FIG. 5B. The laminate structure exhibited good adhesion, hardness and abrasion resistance properties

EXAMPLE 3

Both Side (User Interface Side) Anti-Reflection

This example illustrates the fabrication of a laminate of this invention having anti-reflection layers on both the front (user interface) side and back (viewer interface) side of a flexible substrate. The laminate was prepared using the hard coated PET substrate as described in Example 1. An anti-reflective stack of oxide layers was constructed on the back side of the substrate as described in Example 1 and on the front side as described in Example 2.

Figure 6A:
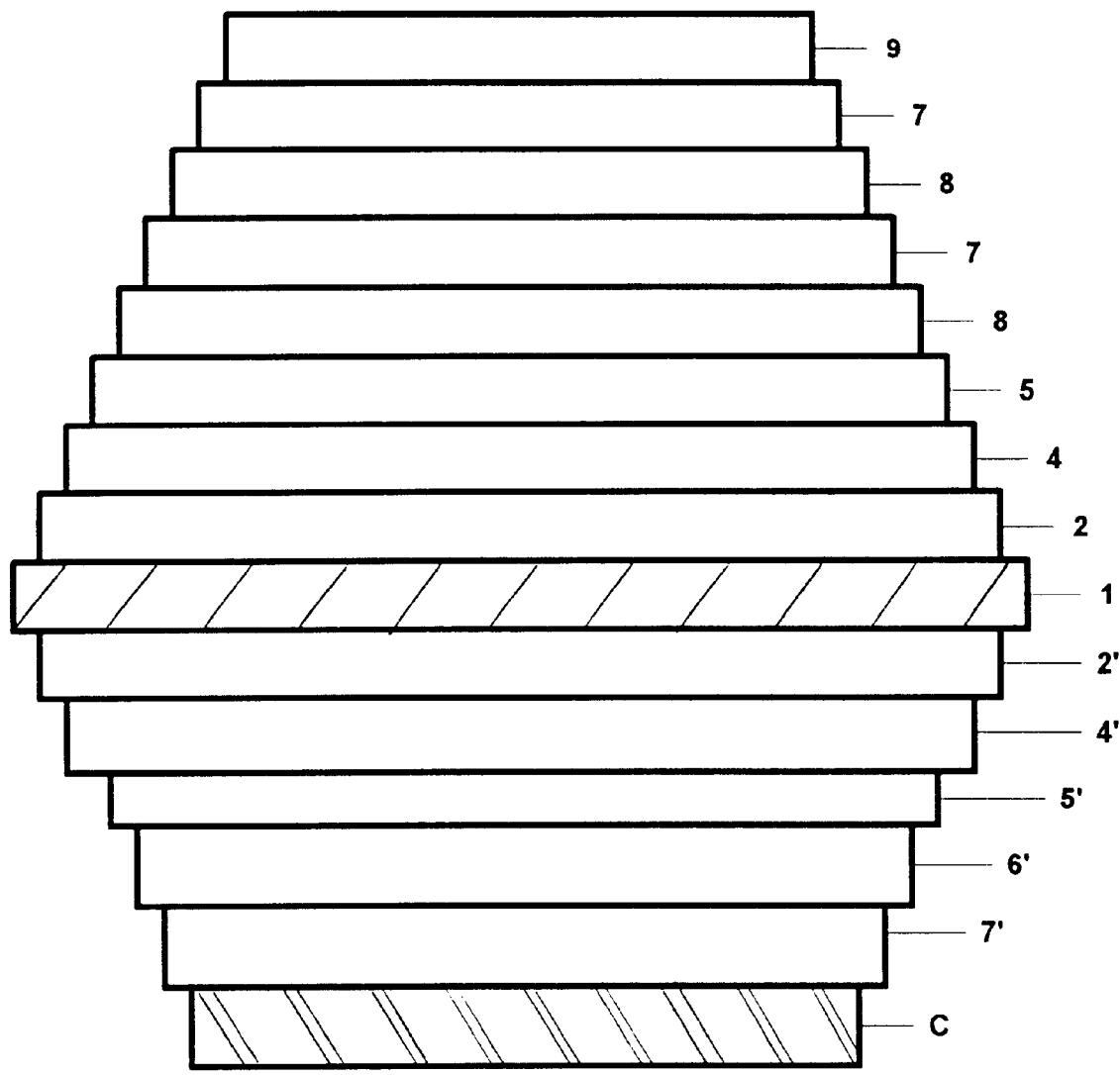
Figure 6B:
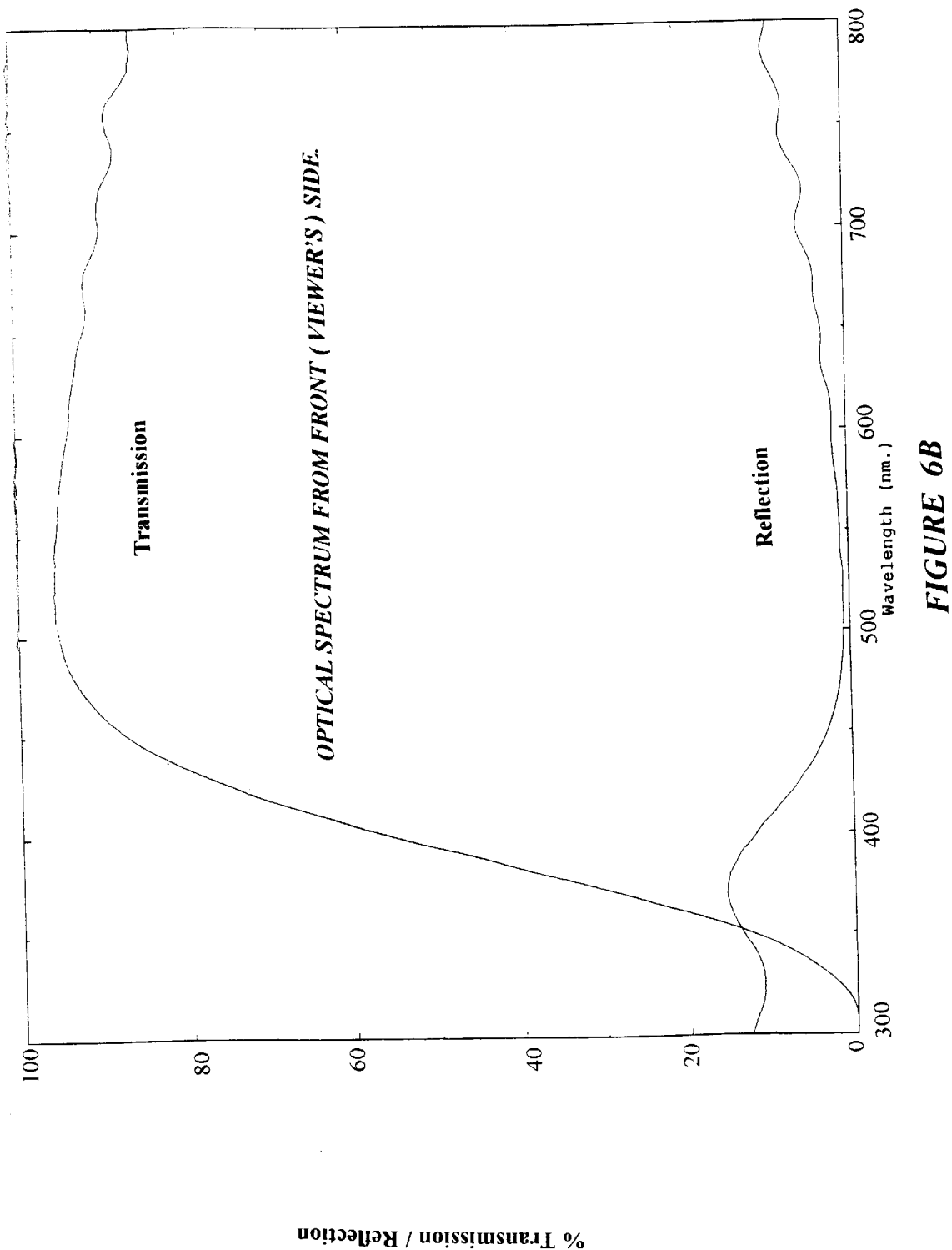

With reference to FIG. 6 there is shown an laminate of this invention having on the back side of PET substrate 1 a hard coat 2', a titanium oxide precoat layer 4', a silicon oxide primer layer 5', a thin film, anti-reflective stack comprising a 28 nm thick layer of titanium dioxide 6', a 64 nm thick layer of silicon dioxide 7' and a 16 nm thick layer of indium tin oxide C which also serves as the electrode surface. On the front side of the PET substrate there is a hard coat 2, a titanium oxide precoat layer 4, a silicon oxide primer layer 5, an anti-reflective stack comprising a 25 nm thick first layer of indium tin oxide, a 25 nm thick first layer of silicon dioxide, a 73 nm thick second layer of indium tin oxide and a 94 nm thick second layer of silicon dioxide, and a 5 to 10 nm thick low energy surface layer of fluoropolymer. Optical properties on the front side showed that the laminate had 95.85% transmittance, 0.78% reflectance and 3.37% absorption at 550 nm. Transmittance and reflectance properties were substantially the same for the front and back side of the laminate. FIG. 6B shows the visible light transmission and reflectance data which was recorded from the front side of the laminate. The laminate structure exhibited good adhesion, hardness and abrasion resistance properties

EXAMPLE 4

This example illustrates an alternative fabrication of an anti-reflective stack layers useful for the laminates of this invention, e.g. on the front (user interface) side of the substrate. The laminate prepared in Example 1 was used to construct an anti-reflective stack of oxide layers on the front side using the vacuum sputtering apparatus described in Example 1. As described in Example 1, the back side of the PET substrate 1 comprised a hard coat 2', a titanium oxide precoat layer 4', a silicon oxide primer layer 5', a titanium dioxide layer 6', a silicon dioxide layer 7' and an indium tin oxide conductor layer C.

Pre-Treatment: A titanium oxide pre-treatment layer 4 was deposited onto the clear hard coat passing at 0.9 mpm by DC magnetron sputtering from a titanium target at 0.8 KW power, 1.5 mTorr total pressure, in a 50:50 argon/oxygen gas mixture.

Intermediate layers: An aluminum oxide intermediate layer 10 was deposited onto the titanium oxide pre-treatment layer passing at 0.9 mpm by dual magnetron sputtering from an aluminum target at 30 KW power, 3.0 mTorr total pressure, in an argon/oxygen mixture with argon fed at 270 sccm and oxygen fed at 150 sccm.

Indium tin oxide layer: An indium tin oxide anti-reflective stack component layer 8 was deposited onto the aluminum oxide primer layer passing at 0.9 mpm by DC magnetron sputtering from a indium tin oxide target at 5.5 KW power, 1.4 mTorr total pressure, in an argon/oxygen mixture with argon fed at 175 sccm and oxygen fed at 13 sccm.

Silicon dioxide layer: A silicon dioxide anti-reflective stack component layer 7 as deposited onto the indium tin oxide layer passing at 0.9 mpm by dual magnetron sputtering from a boron-doped silicon target at 30 KW power, 3.0 mTorr total pressure, in an argon/oxygen mixture with argon fed at 270 sccm and oxygen fed at 170 sccm.

Low surface energy layer: A low surface energy layer 9 of fluoropolymer was deposited as a solution onto the second silicon dioxide anti-reflective stack component layer and allowed to dry to a polymeric film having a thickness of 5 to 10 nm and a surface energy of less than 40 dynes/cm.

Figure 7A:
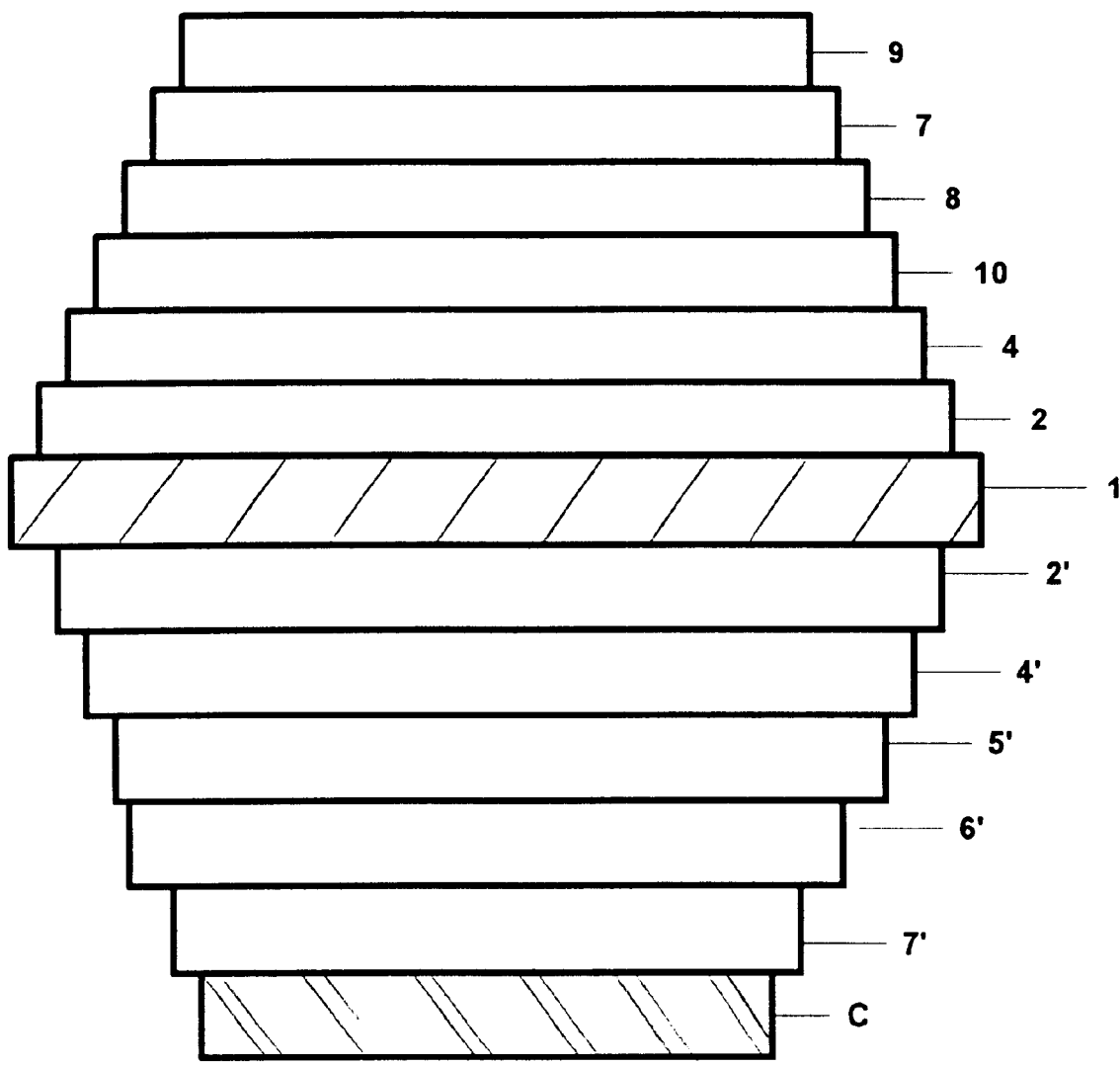
Figure 7B:
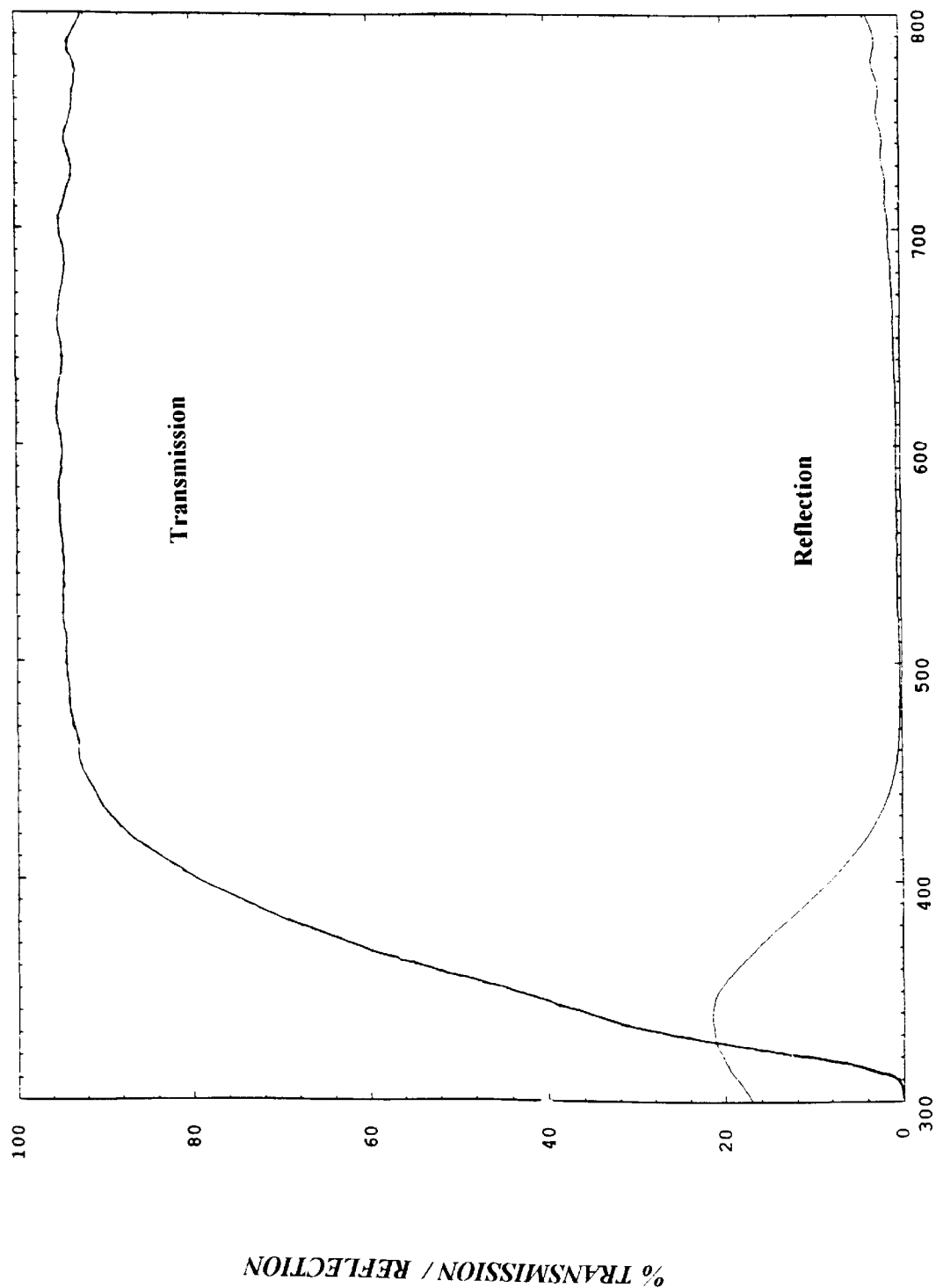

Optical properties, i.e. visible light transmittance and reflectance, for the laminate are plotted in FIG. 7B.

EXAMPLE 5

This example illustrates transparent laminate electrodes of the prior art which are prepared using the vacuum sputtering apparatus described in Example 1.

Figure 8A:
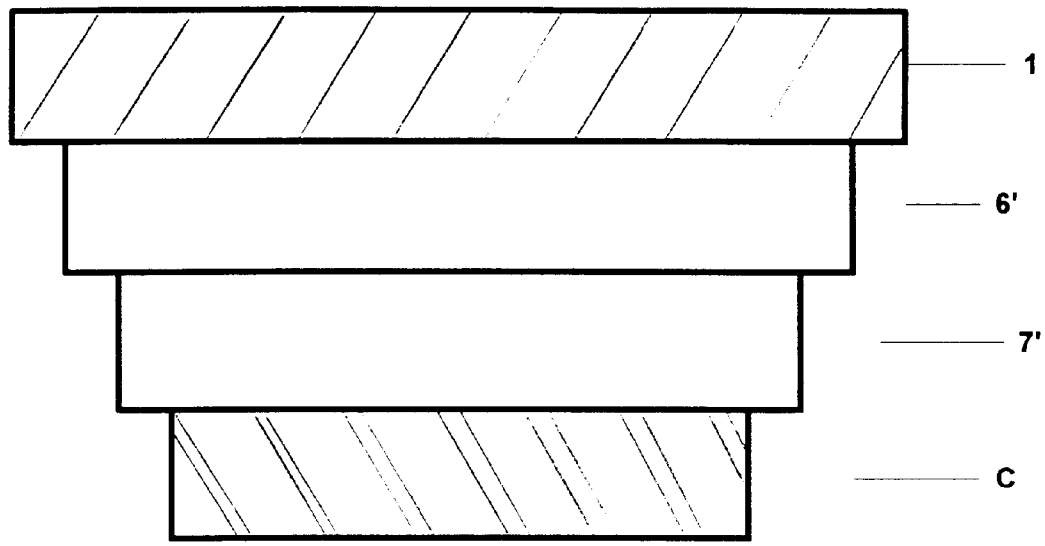

A. As illustrated in FIG. 8A a flexible, transparent, anti-reflected electrode comprises a PET substrate 1 with a pair of anti-reflective layers comprising a 28 nm thick layer of titanium dioxide 6' and a 64 nm thick layer of silicon dioxide 7' and a conductive layer C of indium tin oxide having a conductivity of about 300 ohms per square. Optical properties on the front side of this laminate were determined to be 92.33% transmittance, 5.16% reflectance and 2.51% absorption at 550 nm.

Figure 8B:
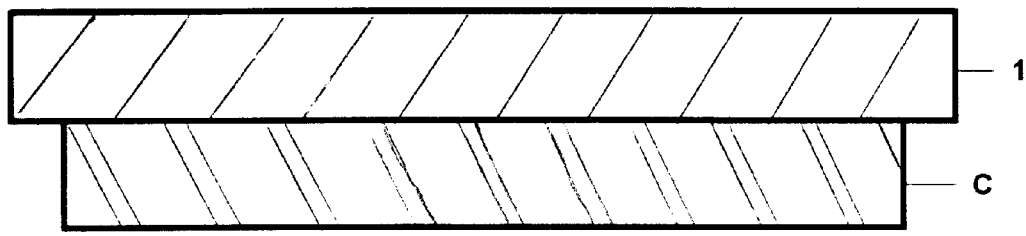

B. As illustrated in FIG. 8B a flexible, transparent, electrode of the prior art comprises an indium tin oxide layer C having a conductivity of about 300 ohms per square deposited onto one side of a PET substrate 1 passing at 4 mpm by DC magnetron sputtering from an indium tin oxide target at 0.5 KW, 1.5 mTorr total pressure in an argon/oxygen mixture with argon fed at 175 sccm and oxygen fed at 9 sccm. Optical properties on the front side of this laminate structure were determined to be 84.75% transmittance, 13.55% reflectance and 1.7% absorption at 550 nm.

Figure 8C:
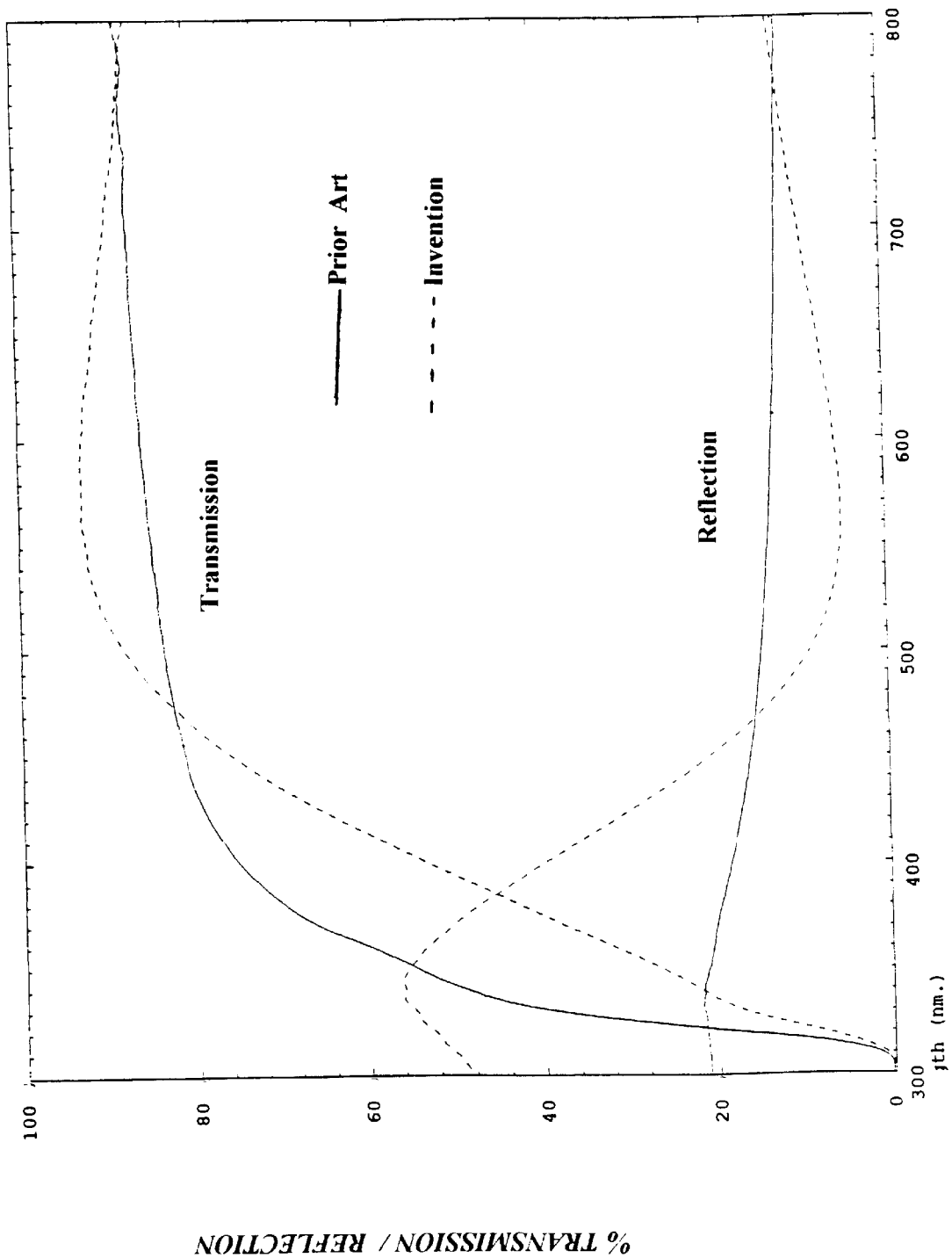

FIG. 8C shows transmittance and reflectance values for a wider spectrum of visible light for the laminates of this Example 5.

EXAMPLE 6

Figure 9:
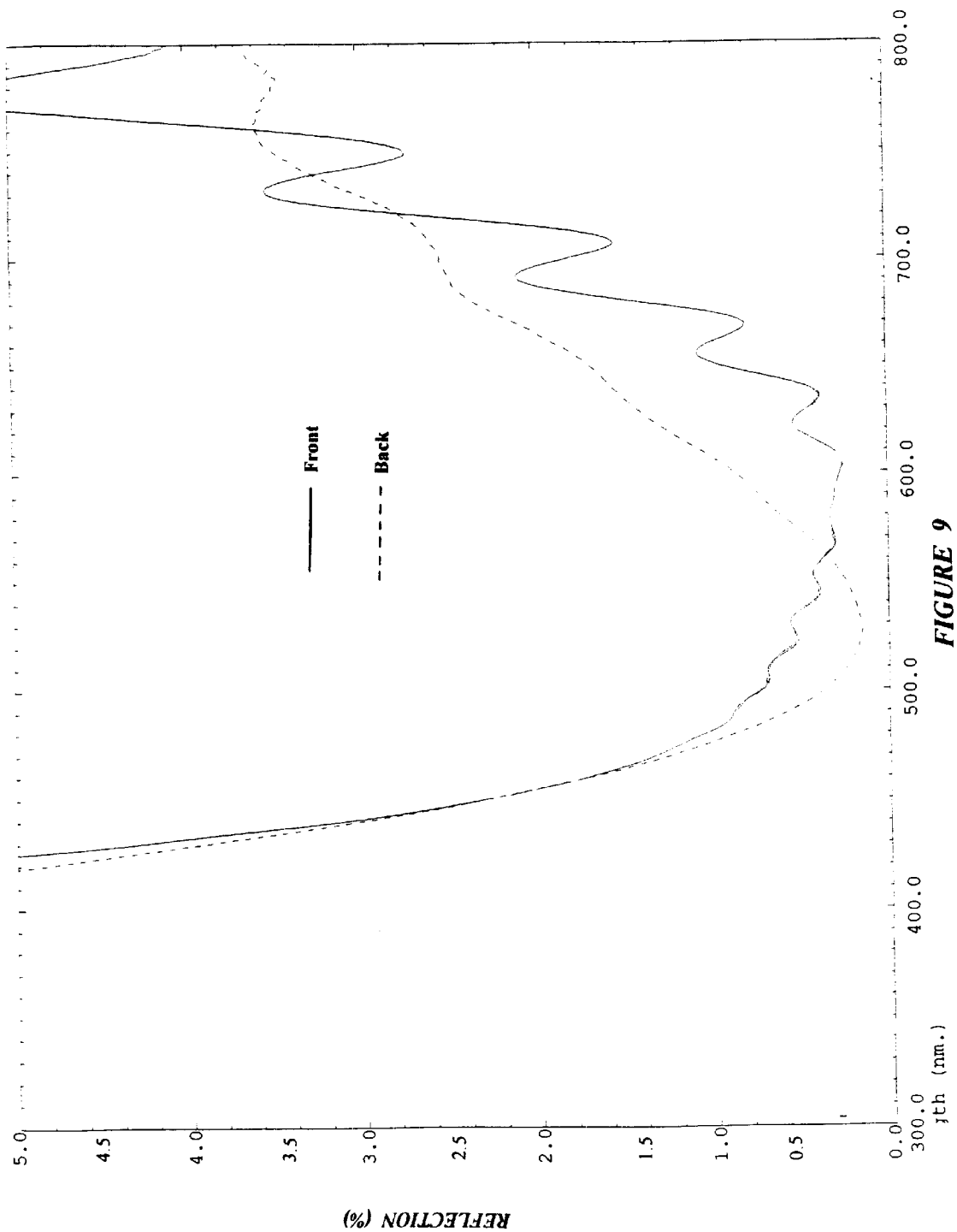

This example illustrates the measurement of reflectance from one side of the laminate prepared in Example 4. The indium tin oxide conductor surface of the laminate was roughened and painted black. Reflectance measured on the front and back side of the laminate is plotted in FIG. 9.

The preceding description is set for forth for purposes of describing the describing various (but not all) aspects of the invention and teaching those skilled in the art how to make and use both the disclosed embodiments and those obvious modifications and improvements of the invention which should be readily apparent to those skilled in the art. It is intended, therefor, that the foregoing be considered as exemplary only and that the full scope and breadth of the invention be ascertained from the following claims.

What is claimed is:

1. A low reflective, transparent electrode comprising:
   (a) a sheet of flexible plastic substrate having first and second sides;
   (b) a first hardcoat adjacent to said first side of said substrate and a second hardcoat adjacent to said second side of said substrate, said first and second hardcoats being anti-glare hardcoats;
   (c) an anti-reflective stack adjacent to said first or second hardcoat, said anti-reflective stack comprising at least one pair of layers of materials of different refractive index; and
   (d) a conductive outer layer adjacent to said anti-reflective stack.

2. The electrode according to claim 1 wherein said conductive outer layer comprises a conductive metal oxide or a conductive polymer.

3. The electrode according to claim 1 wherein said conductive outer layer consists essentially of indium tin oxide.

4. The electrode of claim 1 wherein said electrode has an average visible light reflection of not more than 6% and visible light transmission of at least 80% in the visible light range of 400 to 700 nm.

5. The electrode according to claim 1 having an average visible light reflection of not more than 2% and visible light transmission of at least 90% in the visible light range of 400 to 700 nm.

6. The electrode according to claim 1 in a form of a wound roll of continuous web.

7. The electrode according to claim 1 in which said first and second anti-glare hardcoats are clear.

8. The electrode of claim 1 in which said first or second hardcoat is adjacent to said anti-reflective stack and said hardcoat adjacent to said anti-reflective stack is selected to provide an anti-reflective characteristic so that said hardcoat adjacent to said anti-reflective stack functions as an anti-reflective layer of said stack in addition to providing a durability characteristic of a hardcoat layer.

9. The electrode according to claim 1 which is configured for application other than a touch screen application.

10. The electrode according to claim 1 in which said flexible polymer substrate is polyethylene terephthalate.

11. In a device where data is entered by pressure activation on the surface of a display screen having a membrane electrode, the improvement wherein said membrane electrode comprises at least one flexible, transparent electrode wherein said flexible transparent electrode comprises:
    (a) a sheet of flexible plastic substrate having first and second sides;
    (b) a first hardcoat adjacent to said first side of said substrate and a second hardcoat adjacent to said second side of said substrate;
    (c) an anti-reflective stack adjacent to said first or second hardcoat, said anti-reflective stack comprising at least one pair of layers of materials of different refractive index; and
    (d) a conductive outer layer adjacent to said anti-reflective stack.

12. A low reflective, transparent electrode comprising:
    a) a sheet of flexible plastic substrate having first and second sides;
    b) a first hardcoat adjacent to said first side of said substrate and a second hardcoat adjacent to said second side of said substrate;
    c) a first anti-reflective stack adjacent to said first hardcoat, said first anti-reflective stack comprising at least one pair of layers of materials of different refractive index;
    d) a second anti-reflective stack adjacent to said second hardcoat, said second anti-reflective stack comprising at least one pair of layers of materials of different refractive index, said first or said second anti-reflective stack being nonconductive; and e) a conductive outer layer adjacent to said first anti-reflective stack or said second anti-reflective stack.

13. The electrode according to claim 12 wherein said conductive outer layer comprises a conductive metal oxide or a conductive polymer.

14. The electrode according to claim 12 wherein said conductive outer layer consists essentially of indium tin oxide.

15. The electrode of claim 12 wherein said electrode has an average visible light reflection of not more than 6% and visible light transmission of at least 80% in the visible light range of 400 to 700 nm.

16. The electrode according to claim 12 having an average visible light reflection of not more than 2% and visible light transmission of at least 90% in the visible light range of 400 to 700 nm.

17. The electrode according to claim 12 in a form of a wound roll of continuous web.

18. The electrode according to claim 12 wherein said first or second anti-reflective stack comprises at least one pair of layers comprising a layer of silicon dioxide and an adjacent layer of indium tin oxide.

19. The electrode according to claim 12 wherein said first or second anti-reflective stack is conductive.

20. The electrode, according to claim 12 in which said first and second hardcoats are clear hardcoats.

21. The electrode of claim 12 in which said first hardcoat is adjacent to said first anti-reflective stack and said first hardcoat adjacent to said anti-reflective stack is selected to provide an anti-reflective characteristic so that said first hardcoat adjacent to said first anti-reflective stack functions as an anti-reflective layer of said first anti-reflective stack in addition to providing a durability characteristic of a hardcoat layer; or said second hardcoat is adjacent to said second anti-reflective stack and said second hardcoat adjacent to said second anti-reflective stack is selected to provide an anti-reflective characteristic so that said second hardcoat adjacent to said second anti-reflective stack functions as an anti-reflective layer of said second anti-reflective stack in addition to providing a durability characteristic of a hardcoat layer.

22. The electrode according to claim 12 which further comprises an outer layer of a low surface energy material on a side opposite the outer conductive layer.

23. The electrode according to claim 12 which is configured for application other than a touch screen application.

24. In a device where data is entered by pressure activation on the surface of a display screen having a membrane electrode, the improvement wherein said membrane electrode comprises at least one flexible transparent electrode wherein said flexible transparent electrode comprises:

a) a sheet of flexible plastic substrate having first and second sides;

b) a first hardcoat adjacent to said first side of said substrate and a second hardcoat adjacent to said second side of said substrate;

c) a first anti-reflective stack adjacent to said first hardcoat, said first anti-reflective stack comprising at least one pair of layers of materials of different refractive index;

d) a second anti-reflective stack adjacent to said second hardcoat, said second anti-reflective stack comprising at least one pair of layers of materials of different refractive index; and e) a conductive outer layer adjacent to said first anti-reflective stack or said second anti-reflective stack.

25. A low reflective transparent electrode comprising:

a) a sheet of flexible polymeric substrate;

b) a hardcoat adjacent to one side of said polymeric substrate;

c) a first anti-reflective stack adjacent to said hardcoat and a second anti-reflective stack adjacent to said substrate, said first or second anti-reflective stack being nonconductive and said first and second anti-reflective stacks each comprising at least one pair of layers of materials having different refractive index; and d) a conductive outer layer on said first anti-reflective stack or on said second anti-reflective stack.

26. The electrode of claim 25 wherein said conductive outer layer is adjacent to said first anti-reflective stack.

27. The electrode of claim 25 wherein said conductive outer layer is adjacent to said second anti-reflective stack.

28. The electrode according to claim 25 wherein said hardcoat is either a clear hardcoat or an anti-glare hardcoat.

29. The electrode according to claim 25 wherein said conductive outer layer comprises a conductive metal oxide or a conductive polymer.

30. The electrode according to claim 25 wherein said conductive outer layer consists essentially of indium tin oxide.

31. The electrode of claim 25 wherein said electrode has an average visible light reflection of not more than 6% and visible light transmission of at least 80% in the visible light range of 400 to 700 nm.

32. The electrode according to claim 25 having an average visible light reflection of not more than 2% and visible light transmission of at least 90% in the visible light range of 400 to 700 nm.

33. The electrode according to claim 26 in a form of a wound roll of continuous web.

34. An electrode according to claim 25 wherein said first or second anti-reflective stack comprises at least one pair of layers comprising a layer of silicon dioxide and an adjacent layer of indium tin oxide.

35. The electrode of claim 25 wherein said hardcoat is selected to provide mechanical durability and to provide an anti-reflective characteristic so that said hardcoat in combination with said anti-reflective stack has an anti-reflective function.

36. The electrode according to claim 25 which further comprises having an outer layer of a low surface energy material on a side opposite the outer conductive layer.

37. The electrode according to claim 25 which is configured for application other than for the touch screen application.

38. The electrode of claim 25 wherein said substrate is polyethylene terephthalate and said outer conductive layer comprises a layer of indium tin oxide and said first or second anti-reflective stack comprises at least one layer of silicon dioxide and at least one layer of indium tin oxide adjacent to said layer of silicon dioxide.

39. In a device where data is entered by pressure activation on the surface of a display screen having a membrane electrode, the improvement wherein said membrane electrode comprises at least one flexible transparent electrode wherein said flexible transparent electrode comprises;

a) a sheet of flexible polymeric substrate;

b) a hardcoat adjacent to one side of said polymeric substrate;

c) a first anti-reflective stack adjacent to said hardcoat and a second anti-reflective stack adjacent to said substrate, said first and second anti-reflective stacks each comprising at least one pair of layers of materials having different refractive index; and d) a conductive outer layer on said first anti-reflective stack or on said second anti-reflective stack.

40. A low reflective, transparent electrode comprising:

(a) a sheet of flexible plastic substrate having first and second sides;

(b) a first hardcoat adjacent to said first side of said substrate and a second hardcoat adjacent to said second side of said substrate, said first hardcoat being a clear hardcoat and said second hardcoat being an anti-glare hardcoat;

(c) an anti-reflective stack adjacent to said first or second hardcoat, said anti-reflective stack comprising at least one pair of layers of materials of different refractive index; and (d) a conductive outer layer adjacent to said anti-reflective stack.

41. A low reflective, transparent electrode comprising:

a) a sheet of flexible plastic substrate having first and second sides;

b) a first hardcoat adjacent to said first side of said substrate and a second hardcoat adjacent to said second side of said substrate, said first and second hardcoats being anti-glare hardcoats;

c) a first anti-reflective stack adjacent to said first hardcoat, said first anti-reflective stack comprising at least one pair of layers of materials of different refractive index;

d) a second anti-reflective stack adjacent to said second hardcoat, said second anti-reflective stack comprising at least one pair of layers ,of materials of different refractive index, and e) a conductive outer layer adjacent to said first anti-reflective stack or said second anti-reflective stack.

42. A low reflective, transparent electrode comprising:

a) a sheet of flexible plastic substrate having first and second sides;

b) a first hardcoat adjacent to said first side of said substrate and a second hardcoat adjacent to said second side of said substrate, said first hardcoat being a clear hardcoat and said second hardcoat being an anti-glare hardcoat;

c) a first anti-reflective stack adjacent to said first hardcoat, said first anti-reflective stack comprising at least one pair of layers of materials of different refractive index;

d) a second anti-reflective stack adjacent to said second hardcoat, said second anti-reflective stack comprising at least one pair of layers of materials of different refractive index; and e) a conductive outer layer adjacent to said first anti-reflective stack or said second anti-reflective stack.

* * * * *